(12) United States Patent
Lansink Rotgerink et al.

(10) Patent No.: US 8,314,043 B2
(45) Date of Patent: Nov. 20, 2012

(54) PROCESS FOR THE REGENERATION OF A FISCHER-TROPSCH CATALYST

(75) Inventors: Hermanus Gerhardus Jozef Lansink Rotgerink, Mömbris/Mensengesäβ (DE); Claus Rehren, Aschaffenburg (DE); Dietrich Maschmeyer, Recklinghausen (DE)

(73) Assignee: Evonik Degussa GmbH, Essen (DE)

( * ) Notice: Subject to any disclaimer, the term of this patent is extended or adjusted under 35 U.S.C. 154(b) by 606 days.

(21) Appl. No.: 12/515,208

(22) PCT Filed: Oct. 30, 2007

(86) PCT No.: PCT/EP2007/061708
§ 371 (c)(1),
(2), (4) Date: May 15, 2009

(87) PCT Pub. No.: WO2008/061861
PCT Pub. Date: May 29, 2008

(65) Prior Publication Data
US 2010/0081562 A1 Apr. 1, 2010

(30) Foreign Application Priority Data

Nov. 21, 2006 (EP) .................... 06124432

(51) Int. Cl.
*B01J 38/40* (2006.01)
(52) U.S. Cl. .......................... 502/38; 502/56
(58) Field of Classification Search ............. 502/38, 502/56
See application file for complete search history.

(56) References Cited

U.S. PATENT DOCUMENTS

| | | | |
|---|---|---|---|
| 2,159,140 A | 5/1939 | Eckll et al. | |
| 2,238,726 A | 4/1941 | Feisst et al. | |
| 2,247,087 A | 6/1941 | Herbert et al. | |
| 2,259,961 A | 10/1941 | Whalley et al. | |
| 2,289,731 A | 7/1942 | Roelen et al. | |
| 2,440,109 A | 4/1948 | Moore | |
| 2,458,870 A | 1/1949 | Ogorzaly | |
| 2,518,337 A | 8/1950 | Krebs | |
| 2,616,911 A | 11/1952 | Asseff et al. | |
| 4,729,981 A | 3/1988 | Kobylinski et al. | |
| 4,973,453 A | 11/1990 | Agee | |
| 5,292,705 A | 3/1994 | Mitchell | |
| 5,529,963 A | 6/1996 | Maschmeyer | |
| 5,733,941 A | 3/1998 | Waycuilis | |
| 5,844,005 A | 12/1998 | Bauman et al. | |
| 5,861,441 A | 1/1999 | Waycuilis | |
| 6,201,030 B1 | 3/2001 | Beer | |
| 6,323,248 B1 | 11/2001 | Mart et al. | |

FOREIGN PATENT DOCUMENTS

DE 4318095 A1 12/1994

OTHER PUBLICATIONS

State Intellectual Property Office of the P.R. China "Novelty Search Report" (Form GCC/SIPO/610) mailed Mar. 3, 2011 for Application No. GCC/P/2007/9503.
State Intellectual Property Office of the P.R. China "Examination Report" (Form GCC/SIPO/637) dated Feb. 22, 2011 for Application No. GCC/P/2007/9503.
International Preliminary Report on Patentabilty issued on corresponding PCT/EP2007/061708 filed on Oct. 30, 2007.
International Search Report issued in priority application No. PCT/EP2007/061708 having a filing date of Oct. 30, 2007.
H. Schulz, Applied Catalysis A: General 1999, 186, p. 3.
Sie and Krishna, Applied Catalysis A: General 1999, 186, p. 55.

*Primary Examiner* — Edward Johnson
(74) *Attorney, Agent, or Firm* — Smith, Gambrell & Russell, LLP

(57) ABSTRACT

A process is disclosed for the regeneration of a deactivated wax covered Fischer-Tropsch catalyst, a pumpable suspension of deactivated catalyst being injected into a hot gas stream and the regenerated catalyst then being separated off from the gas stream, optionally further treated by calcination and/or reduction.

11 Claims, No Drawings

PROCESS FOR THE REGENERATION OF A FISCHER-TROPSCH CATALYST

This application claims the benefit of International Application PCT/EP2007/061708 filed Oct. 30, 2007 and EP Application 06124432.3 filed Nov. 21, 2006 which are relied on and incorporated herein by reference.

INTRODUCTION AND BACKGROUND

Natural gas, found in deposits in the earth, is an abundant energy resource. For example, natural gas commonly serves as a fuel for heating, cooking, and power generation, among other things. The process of obtaining natural gas from an earth formation typically includes drilling a well into the formation. Wells that provide natural gas are often remote from locations with a demand for the consumption of the natural gas.

Thus, natural gas is conventionally transported large distances from the wellhead to commercial destinations in pipelines. This transportation presents technological challenges due in part to the large volume occupied by a gas. Because the volume of an amount of gas is so much greater than the volume of the same number of gas molecules in a liquefied state, the process of transporting natural gas typically includes chilling and/or pressurizing the natural gas in order to liquefy it. However, this contributes to the final cost of the natural gas and is not economical.

Formations that include small amounts of natural gas may include primarily oil, with the natural gas being a byproduct of oil production that is thus termed associated gas. In the past, associated gas has typically been flared, i.e., burned in the ambient air. However, current environmental concerns and regulations discourage or prohibit this practice.

Further, naturally occurring sources of crude oil used for liquid fuels such as gasoline, jet fuel, kerosene, and diesel fuel have been decreasing and supplies are not expected to meet demand in the coming years. Fuels that are liquid under standard atmospheric conditions have the advantage that in addition to their value, they can be transported more easily in a pipeline than natural gas, since they do not require liquefaction.

Thus, for all of the above-described reasons, there has been interest in developing technologies for converting natural gas to more readily transportable liquid fuels, i.e. to fuels that are liquid at standard temperatures and pressures.

The above is also known as GTL (gas to liquid), i.e. the conversion of natural gas into other, heavier hydrocarbons. Instead of using gas, also coal or biomass can be used as the feed stock for making synthesis gas. For the coal feedstock, the process is known as CTL, when based on biomass the abbreviation BTL is commonly used. The general principle is to convert the feedstock into synthesis gas which is then converted into the desired hydrocarbons. The term XTL is also sometimes used to describe the general process, X stands in this case for any feedstock that can be converted into synthesis gas.

One method for converting natural gas, coal and/or biomass to liquid fuels involves two sequential chemical transformations. In case of GTL, the first transformation, natural gas or methane, the major chemical component of natural gas, is reacted with oxygen and/or steam to form syngas, which is a combination of predominantly carbon monoxide gas and hydrogen gas. Syngas (or synthesis gas) can also contain carbon dioxide. In case of CTL, coal is gasified to syngas. In case of BTL, biomass is gasified to syngas. The production of syngas itself can normally includes multiple steps. After making the CO/H2 containing gas mixture, the syngas often needs to be purified to remove certain substances that would cause problems downstream in the Fischer-Tropsch section. After the syngas has been optionally purified, the second transformation, known as the Fischer-Tropsch process takes place. The predominant reaction is between carbon monoxide and hydrogen to form organic molecules containing carbon and hydrogen. Those molecules containing only carbon and hydrogen are known as hydrocarbons. Those molecules containing oxygen in addition to carbon and hydrogen are known as oxygenates. Hydrocarbons having carbons linked in a straight chain are known as aliphatics and are particularly desirable as the basis of synthetic diesel fuel.

The Fischer-Tropsch process is commonly facilitated by a catalyst. Catalysts desirably have the function of increasing the rate of a reaction without being consumed by the reaction. Common catalysts for use in the Fischer-Tropsch process contain at least one metal from Groups 8, 9, or 10 of the Periodic Table (in the new IUPAC notation, which is used throughout the present specification). The molecules react to form hydrocarbons while confined on the surface of the catalyst. The hydrocarbon products then desorb from the catalyst and can be collected. H. Schulz (Applied Catalysis A: General 1999, 186, p 3) gives an overview of trends in Fischer-Tropsch catalysis.

The catalyst may be contacted with synthesis gas in a variety of reaction zones that may include one or more reactors. Common reactors include packed bed (also termed fixed bed) reactors, slurry bed reactors, and fluidized bed reactors. Originally, the Fischer-Tropsch synthesis was carried out in packed bed reactors. These reactors have several drawbacks, such as poor temperature control, that can be overcome by gas-agitated slurry reactors or slurry bubble column reactors. Gas-agitated multiphase reactors sometimes called "slurry reactors" or "slurry bubble columns," operate by suspending catalytic particles in liquid and feeding gas reactants into the bottom of the reactor through a gas distributor, which produces small gas bubbles. As the gas bubbles rise through the reactor, the reactants are absorbed into the liquid and diffuse to the catalyst where, depending on the catalyst system, they are typically converted to gaseous and liquid products. The gaseous products formed enter the gas bubbles and are collected at the top of the reactor. Liquid products are recovered from the suspending liquid by using different techniques like filtration, settling, hydrocyclones, magnetic techniques, etc. Gas-agitated multiphase reactors or slurry bubble column reactors (SBCRs) inherently have very high heat transfer rates; therefore, reduced reactor cost and the ability to remove and add catalyst online are principal advantages of such reactors in Fischer-Tropsch synthesis, which is exothermic. Sie and Krishna (Applied Catalysis A: General 1999, 186, p. 55) give a history of the development of various Fischer Tropsch reactors.

Typically the Fischer-Tropsch product stream contains hydrocarbons having a range of numbers of carbon atoms, and thus having a range of molecular weights. Thus, the Fischer-Tropsch products produced by conversion of synthesis gas commonly contains a range of hydrocarbons including gases, liquids and waxes. It is highly desirable to maximize the production of high-value liquid hydrocarbons, such as hydrocarbons with at least 5 carbon atoms per hydrocarbon chain (C.sub.5+ hydrocarbons).

The composition of a catalyst influences the relative amounts of hydrocarbons obtained from a Fischer-Tropsch catalytic process. Cobalt metal is particularly desirable in catalysts used in converting synthesis gas to hydrocarbons suitable for the production of diesel fuel. Further, iron, nickel, and ruthenium have been used in Fischer-Tropsch catalysts. Nickel catalysts favor termination of the chain growth and are useful for aiding the selective production of methane from syngas. Iron has the advantage of being readily available and relatively inexpensive but the disadvantage of a water-gas shift activity. Ruthenium has the advantage of high activity but is quite expensive.

One of the limitations of a Fischer-Tropsch process is that the activity of the catalyst will, due to a number of factors, deteriorate over time.

The commercial incentives for a process to convert synthesis gas to liquid fuels and other products are increasing as the need for energy sources increases. One successful approach to meeting this need has been to make synthesis gas and then synthetically convert the synthesis gas into heavier hydrocarbons ($C_{5+}$) through the Fischer-Tropsch (F-T) process. The synthetic production of hydrocarbons by the catalytic reaction of synthesis gas is well known and is generally referred to as the Fischer-Tropsch reaction. This F-T process was developed approximately eighty years ago in Germany, and since then, it has been practiced commercially in Germany during World War II and later in South Africa. In recent times, very large, new GTL and CTL complexes are built in other countries as well.

Fischer-Tropsch hydrocarbon conversion systems typically have a synthesis gas generator and a Fischer-Tropsch reactor unit. In the case of starting with a gas feed stock, the synthesis gas generator receives light, short-chain hydrocarbons such as methane and produces synthesis gas. The synthesis gas is then delivered to a Fischer-Tropsch reactor. In the F-T reactor, the synthesis gas is primarily converted to useful $C_{5+}$ hydrocarbons. Recent examples of Fischer-Tropsch systems are included in U.S. Pat. Nos. 4,973,453; 5,733,941; and 5,861,441.

Numerous types of reactor systems have been used for carrying out the Fischer-Tropsch reaction. See generally the many examples found on www.fischertropsch.org. The commercial development of the Fischer-Tropsch reactor systems has included conventional fixed-bed and three-phase slurry bubble column designs or other moving-bed designs. But, due to the complicated interplay between heat and mass transfer and the relatively high cost of Fischer-Tropsch catalysts, no single reactor design has dominated the commercial developments to date.

Fischer-Tropsch three-phase bubble column reactors or the like appear to offer distinct advantages over the fixed-bed design in terms of heat transfer and diffusion characteristics. One particular type of three-phase bubble column is the slurry bubble column, wherein the catalyst size is generally between 10 and 200 microns (μm). Three-phase bubble column reactors present a number of technical challenges.

The technical challenges associated with three-phase bubble columns include solids management. One particular challenge in this area is to efficiently rejuvenate slurry catalysts. When a slurry Fischer-Tropsch catalyst is used over time, it has a disadvantage of slowly, but reversibly, deactivating compared to its initial catalytic activity. As the synthesis gas (primarily $H_2$ and CO) is fed to the Fischer-Tropsch reactor and converted with the F-T catalyst, the catalyst experiences deactivation caused by carbon build up, physical degradation, and the effects of trace compounds other than CO and $H_2$, such as by nitrogen containing species or oxygenated byproducts. "Carbon build up" references the accumulation of heavy hydrocarbons and carbonaceous type material that can have a hydrogen content less than that of F-T products. To remedy the deactivation, the catalyst is regenerated, or rejuvenated, using any of a number of techniques.

Rejuvenation is different from the initial activation of the Fischer-Tropsch catalyst. For cobalt catalysts, the initial activation involves converting the cobalt to a reduced state. An example of an initial activation technique is found U.S. Pat. No. 4,729,981, entitled "ROR-Activated Catalyst for Synthesis Gas Conversion," which describes the initial preparation of a cobalt or nickel based Fischer-Tropsch catalyst by reducing it in hydrogen, oxidizing it in an oxygen-containing gas, and then reducing it in hydrogen. The catalyst is then ready for its initial use. Once in use, it will begin to deactivate, and it will need regeneration.

Regeneration of a Fischer-Tropsch catalyst after activation and operation has long been known to restore the activity of the catalyst. See, e.g., H. H. Storch et al., The Fischer-Tropsch And Related Synthesis (Wiley: New York 1951), 211 222. Storch describes using hydrogen treatments to restore the catalyst activity. There are many other examples. For example, U.S. Pat. No. 2,159,140 describes pulling the catalyst from the reactor (where it appears to have been fluidized) and removing the catalyst and treating it with hydrogen to regenerate the catalyst. U.S. Pat. No. 2,238,726 indicates that the non-volatile reaction products can be removed from the catalyst by treating it with hydrogen or gases or vapors containing hydrogen and that this can be done in the midst of oil circulation. Col. 2:34 54. As another example, U.S. Pat. No. 2,616,911 describes oxidizing the catalyst and then reducing it while maintaining it in suspension or a fluidized state. Other examples relating to regenerating and/or de-waxing Fischer-Tropsch catalysts include U.S. Pat. Nos. 6,323,248 B1; 6,201, 030 B1; 5,844,005; 5,292,705; 2,247,087; 2,259,961; 2,289, 731; 2,458,870; 2,518,337; and 2,440,109.

Regenerating a slurry catalyst presents particular challenges, because the catalyst is in slurry form. Elaborate efforts have been made to separate the catalyst to allow regeneration outside the Fischer-Tropsch reactor or to regenerate it in-situ. The rejuvenation can be carried out intermittently or continuously.

As an example of a regeneration process, U.S. Pat. No. 5,973,012 describes a reversibly deactivated, particulate slurry catalyst that is rejuvenated by circulating the slurry from a slurry body through (i) a gas disengaging zone to remove gas bubbles from the slurry, (ii) a catalyst rejuvenation zone in which a catalyst rejuvenating gas contacts the catalyst in the slurry to rejuvenate it and to form a rejuvenated catalyst slurry, and (iii) a means for returning catalyst to the slurry body. This design appears to be primarily for use as in-situ regeneration design. The "in-situ" regeneration offers the advantage of keeping the catalyst in the slurry matrix; however, it presents many challenges. Amongst other challenges in-situ regeneration, the $H_2$ partial pressure in the process is limited due to the low solubility of $H_2$ in the liquid phase. Typically, the $H_2$ partial pressure exposed to the catalyst within the liquid phase is less than about 10% of that in the gas phase. In addition, the hydrogen used to regenerate may modify the $H_2$:CO ratio in the reactor for some time. Further still, the temperature may be limited by the boiling point and/or cracking properties of the liquid slurry constituents. For these reasons, "in situ" regeneration has real limitations.

Further on it is known to regenerate a Fischer-Tropsch-Catalyst by a process for converting light hydrocarbons into heavier hydrocarbons ($C_{5+}$) that includes regenerating a slurry Fischer-Tropsch catalyst in need of regeneration, the process comprising the steps of: preparing a synthesis gas using light hydrocarbons; converting the synthesis gas to Fischer-Tropsch products in a slurry Fischer-Tropsch reactor containing a slurry Fischer-Tropsch catalyst; removing Fischer-Tropsch products from the slurry Fischer-Tropsch reactor; regenerating the slurry Fischer-Tropsch catalyst that needs regeneration; and wherein the step of regenerating the slurry Fischer-Tropsch catalyst comprises the steps of: removing the catalyst from the slurry Fischer-Tropsch reactor; de-waxing and drying the catalyst sufficiently to produce a free-flowing catalyst powder that is fluidizable; fluidizing the catalyst powder; treating the catalyst powder with an oxygen treatment to remove hydrocarbons from the catalyst powder, reducing the catalyst powder with a reducing gas, re-slurring the catalyst powder to form a regenerated slurry catalyst; and returning the regenerated slurry catalyst to the slurry Fischer-Tropsch reactor (U.S. Pat. No. 6,989,403).

SUMMARY OF THE INVENTION

Accordingly, one object of the present invention is to provide a process for the regeneration of a deactivated, wax covered Fischer-Tropsch catalyst which is safe and with which there is no risk either of self-ignition of the catalyst or of a dust explosion.

It has now surprisingly been found that a deactivated, wax covered Fischer-Tropsch catalyst can be completely regenerated by injecting a pumpable suspension of the deactivated wax covered Fischer-Tropsch catalyst into a hot gas stream and then separating off the regenerated catalyst from the gas stream. Self-ignition of the catalyst and dust explosions are excluded from this process.

The present invention provides a process for the regeneration of a deactivated, wax covered Fischer-Tropsch catalyst, comprising injecting a pumpable suspension of the deactivated wax covered Fischer-Tropsch catalyst into a hot gas stream and subsequently separating off the regenerated catalyst from the gas stream.

The process according to the invention is particularly advantageous for the regeneration of a deactivated wax covered Fischer-Tropsch catalyst. Since in this case, the catalyst is already present in from of a slurry.

DETAILED EMBODIMENTS OF INVENTION

In the process according to the invention, the regenerated catalyst can be separated off dry from the gas stream or it can be scrubbed out from the gas stream with formation of a suspension.

Deactivated catalysts suitable for regeneration according to the present invention preferably have a mean particle size between 1 µm and 300 µm.

Fischer-Tropsch catalysts means all types of FT-catalysis especially cobalt-containing catalysts.

The process according to the invention can be particularly advantageously carried out if the hot gas stream, into which the suspension of the deactivated wax covered Fischer-Tropsch catalyst is injected, is in a turbulent flow state.

The oxygen content of the hot gas stream is preferably 5 to 20% by volume, particularly preferably 8 to 12% by volume.

The temperature of the hot gas stream is preferably 300° C. to 1050° C., particularly preferably 600° C. to 850° C.

The residence time of the deactivated catalyst in the hot gas stream is preferably 0.01 to 10 sec, particularly preferably 0.1 to 2 sec.

The thus regenerated catalyst can be further treated by a calcination step and/or reduction step.

The process of the present invention can suitably be carried out as follows: A pumpable suspension of the deactivated wax covered Fischer-Tropsch catalyst is continuously injected into an oxygen-containing, turbulent, preheated gas stream having a temperature of about 700° C. to 900° C. Water, if present at all, evaporates very rapidly. Immediately thereafter a sudden degassing of the deactivated catalyst takes place. The escaping gas burns immediately and reheats the gas stream which has lost heat by the evaporation of water and/or lighter hydrocarbons. A very rapid burning off of the carbon compounds in the catalyst particles then takes place, since the catalyst particles are freely suspended in the gas stream and the gas exchange proceeds extremely rapidly. By equally rapid release of the energy of the particles to the gas stream, via heat conduction and particle impact, overheating of the particles, as could occur in the case of uncontrolled oxygen feed to a packed bed of catalyst material as a result of heat transmission by radiation, is reliably prevented. The particles are then separated off from the gas stream. It is possible to insert a further step for heat recovery, for example for pre-heating the combustion air.

The regeneration according to the invention of a deactivated catalyst can be carried out, for example, in a TURAKTOR (an apparatus available from the Eisenmann company for the thermal treatment of waste materials). In such an apparatus, an annular channel is impinged tangentially by a hot gas from a burner. The hot gas flows from the annular channel through vanes into the interior and in the course of this is set in rapid circulation.

The circulating hot gas travels upwards in a spiral motion along the walls in the actual turbulator chamber. As a result of the high gas velocity at the bottom, a part-stream is sucked back into the center where it mixes with fresh hot gas. The suspension of the deactivated catalyst is injected into this central backflow via a spray nozzle furnished with a water cooling jacket and having a two-component nozzle. Because of the high gas velocities and turbulences achieved after a short pathway, the catalyst particles are very finely distributed, the lighter hydrocarbons of the wax evaporate virtually instantaneously and the burning off of the heavier hydrocarbons of the wax or of hydrogen-deficient hydrocarbons on the catalyst particles proceeds extremely rapidly as a result of the minimized mass transport limitation. At the same time, good heat exchange is ensured between the hot gas and the catalyst particles. The temperatures are measured in the clean, hot gas in the annular channel and at the outlet of the equipment. Air can be additionally added into the equipment chamber by a further annular channel. An inspection glass permits observation of the flame vortex.

The exhaust gas stream passes through a delay time section of generally approximately 3 m in length. The first separation of burnt-out, regenerated catalyst particles then proceeds in a hot cyclone. The exhaust gas is then cooled via an air preheater before the exhaust gas is freed from the residual catalyst particles by circulating a liquid like for instance water or a suitable hydrocarbon in a venturi scrubber and is conducted away into the stack by a downstream suction fan. The current oxygen content of the exhaust gas is measured there via an oxygen analyzer.

The process according to the invention can be used to remove the wax from the deactivated wax-covered Fischer-Tropsch catalysts. Further on, it can be used to oxidize the catalyst or/and to reduce the catalyst after having been freed from the wax.

The calcination and/or reduction step can be done in a separate kiln or a separate fluid bed reactor.

According to the invention it is possible to combine the steps of the removing of the wax and the oxidation of the catalyst into one single step, if the process is done with an oxygen containing gas stream.

The process according to the invention is much faster than the known methods to regenerate the deactivated wax covered Fischer-Tropsch catalysts.

The invention claimed is:

1. A process for the regeneration of a deactivated, wax covered cobalt-containing Fischer-Tropsch catalyst, comprising:
   injecting a pumpable liquid suspension of a deactivated wax covered Fischer-Tropsch catalyst into an oxygen-containing gas stream at from 600° C. to 1050° C. to regenerate said catalyst, and
   separating off the regenerated catalyst from the gas stream, wherein the residence time of said deactivated catalyst in said gas stream is from 0.01 to 10 sec.

2. The process according to claim 1, wherein the regenerated catalyst is further treated by a calcintration step and/or reduction step.

3. The process according to claim 1, wherein said regenerated catalyst is separated off dry from the gas stream.

4. The process according to claim 1, wherein said regenerated catalyst is scrubbed out from the gas stream forming a suspension.

5. The process according to claim 1, wherein said gas stream is in a turbulent flow state.

6. The process according to claim 1, wherein the oxygen content of said gas stream is of from 5 to 20% by volume, based on the total volume of said hot gas stream.

7. The process according to claim 1, wherein the oxygen content of said gas stream is of from 8 to 12% by volume, based on the total volume of said hot gas stream.

8. The process according to claim 1, wherein the temperature of said hot gas stream is of from 600° C. to 850° C.

9. The process according to claim 1, wherein the residence time of said deactivated Fischer-Tropsch catalyst in said gas stream is of from 0.1 to 2 sec.

10. The process of claim 1, wherein said liquid suspension is a suspension comprising hydrocarbons and catalyst.

11. The process of claim 1, wherein said liquid suspension contains 10 to 80% by weight solids.

* * * * *